United States Patent
Copeland

(10) Patent No.: US 12,316,605 B2
(45) Date of Patent: May 27, 2025

(54) PACKET PROCESSING FOR NETWORK SECURITY GROUPS

(71) Applicant: MICROSOFT TECHNOLOGY LICENSING, LLC, Redmond, WA (US)

(72) Inventor: Aidan Francis Copeland, Enfield (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 193 days.

(21) Appl. No.: 18/324,776

(22) Filed: May 26, 2023

(65) Prior Publication Data

US 2024/0291799 A1 Aug. 29, 2024

Related U.S. Application Data

(60) Provisional application No. 63/448,193, filed on Feb. 24, 2023.

(51) Int. Cl.
*H04L 9/40* (2022.01)
*H04L 45/74* (2022.01)
*H04L 47/2441* (2022.01)

(52) U.S. Cl.
CPC .......... *H04L 63/0236* (2013.01); *H04L 45/74* (2013.01); *H04L 47/2441* (2013.01); *H04L 63/104* (2013.01)

(58) Field of Classification Search
CPC .. H04L 63/0236; H04L 45/74; H04L 47/2441
See application file for complete search history.

(56) References Cited

U.S. PATENT DOCUMENTS

| | | | | |
|---|---|---|---|---|
| 9,881,165 | B2* | 1/2018 | Litichever | G06F 21/85 |
| 11,979,323 | B2* | 5/2024 | Labonte | H04L 45/745 |
| 2004/0160903 | A1* | 8/2004 | Gai | H04L 63/105 |
| | | | | 370/254 |

(Continued)

FOREIGN PATENT DOCUMENTS

| EP | 2795872 B1 | 9/2015 |
|---|---|---|
| EP | 3611888 B1 | 5/2021 |

OTHER PUBLICATIONS

Gupta, et al., "Packet classification on multiple fields", In Proceedings of the conference on Applications, technologies, architectures, and protocols for computer communication, pp. 147-160.

(Continued)

*Primary Examiner* — Hieu T Hoang
(74) *Attorney, Agent, or Firm* — Han Gim; Newport IP, LLC

(57) ABSTRACT

Techniques are disclosed for generating a network packet classifier for network security groups. The network packet classifier is processed by a graph-based packet processor in a communications network. The network packet classifier is configured to classify network packets based on features grouped into feature types corresponding to header fields of the network packets. A single feature classifier is generated to model all rules in a network security group for a single data traffic direction. The single feature classifier is generated by grouping header fields, features, and feature match actions for network packets in the communications network.

20 Claims, 15 Drawing Sheets

(56) References Cited

U.S. PATENT DOCUMENTS

| | | | | |
|---|---|---|---|---|
| 2011/0038375 | A1* | 2/2011 | Liu | H04L 47/2441 |
| | | | | 370/392 |
| 2014/0050002 | A1* | 2/2014 | Sun | G11C 15/00 |
| | | | | 365/49.1 |
| 2014/0325590 | A1* | 10/2014 | Lavi | H04L 63/0263 |
| | | | | 726/1 |
| 2015/0020152 | A1* | 1/2015 | Litichever | H04L 63/14 |
| | | | | 726/1 |
| 2018/0152385 | A1* | 5/2018 | Xu | H04L 47/32 |
| 2020/0050633 | A1* | 2/2020 | Evans | H04L 45/74 |
| 2020/0053012 | A1* | 2/2020 | Evans | H04L 69/22 |
| 2020/0235990 | A1* | 7/2020 | Janakiraman | H04L 41/0893 |
| 2022/0255854 | A1 | 8/2022 | Baker | |
| 2023/0239306 | A1* | 7/2023 | Hayrapetyan | G06F 16/9024 |
| | | | | 726/1 |
| 2023/0412496 | A1* | 12/2023 | Kreger-Stickles | |
| | | | | H04L 63/0272 |

OTHER PUBLICATIONS

International Search Report and Written Opinion received for PCT Application No. PCT/US2024/016339, May 14, 2024, 15 pages.

\* cited by examiner

PACKET PROCESSING FOR NETWORK SECURITY GROUPS

This application claims the benefit of and priority to U.S. Provisional Application No. 63/448,193, filed Feb. 24, 2023, the entire contents of which are incorporated herein by reference.

BACKGROUND

Cloud service providers provide computing services as a remote computing service or "software as a service.". Software defined networking (SDN) enables centralized configuration and management of physical and virtual network devices as well as dynamic and scalable implementation of network policies. The efficient processing of data traffic is important for maintaining scalability and efficient operation in such networks.

The processing of data traffic includes packet classification, which involves identifying flows to which packets belong when they arrive at network elements such as routers, switches, or firewalls. Packet processing is an important network function that enables packet processors to support access control, quality of service differentiation, virtual private networking, and other network services. To be classified as belonging to a flow, for example corresponding to a particular network application, each packet arriving at a network element is compared against a set of filters or rules. Each rule can include criteria relating to one or more packet header fields and their associated values for identifying a network application, a priority, and/or an action. The criteria generally correspond to specific fields of the packet header, such as the source and destination IP addresses, port numbers, and protocol identifier. A packet is said to match a rule if it matches every header field in that rule. In response to identifying the matching rules, actions associated with the rules are executed.

It is with respect to these considerations and others that the disclosure made herein is presented.

SUMMARY

Various kinds of packet classification algorithms can be implemented in a packet processing function, such as linear search algorithms, hierarchical trie-based algorithms, and match-action classifier algorithms. Match-action classifiers search a set of match-action table entries until a match is found, in which case a set of one or more actions that are associated with the match are applied to a packet. If no match is found, the packet is allocated to a no-match output. An action can also be associated with the no-match output. A mask is typically defined for each match-action classifier, to reduce the number of table entries required. Match-action classifiers can be implemented as hardware modules in hardware network elements or as software modules in software defined network (SDN) elements.

The present disclosure enables efficient matching of packets against network security groups (NSGs) using a classifier and match-action framework. NSG rules typically describe permit/deny rules based on packets matching any combination of one or more of:
  packet source address or prefix, or a comma-separated list of addresses or prefixes
  packet destination address or prefix, or a comma-separated list of addresses or prefixes
  packet source port range, which may be a comma-separated list of ranges
  packet destination port range, which may be a comma-separated list of ranges
  packet protocol.

Rules are specified as applying to inbound or outbound traffic and have a relative priority value.

Some service providers implement fast packet processing in software using a packet processing engine. Rapid packet processing in software enables packet processing that can approach performance of dedicated hardware while incurring lower cost and the ability to flexibly process new instances of cloud-based microservices.

The packet processing engine implements packet processing using classifiers and match actions. Classifiers perform matching on packets and feed into match actions which determine an action to carry out based on the packet match. Higher performance is achieved by minimizing the number of classifiers, although a classifier can include a high number of checks.

A typical packet processing engine architecture groups fields, features, and feature match actions under classifiers. In an embodiment of the present disclosure, a single feature classifier is used to model all rules in an NSG for one direction. As used herein, a direction in the context of network traffic generally refers to the path or flow of data packets between devices on a network. For example, the direction identifies whether the traffic is inbound or outbound relative to a device or network segment. Typically the directions include inbound traffic for data packets that are flowing into a device or network segment from external sources, and outbound traffic for data packets that are flowing out of a device or network segment towards external destinations.

In one embodiment, multiple fields, features, and feature match actions are associated with a feature classifier as follows:
  A field is created to identify the offset and netmask for any part of a packet that are to be matched against any of the rules in the NSG. For example, if a rule matches against the source address, a field is created that identifies the offset and netmask of the source address in a packet.
  A feature is created to specify the matching value that a field must take for any one of the rules in the NSG. For example, if two rules match against different values of source address, two features are created referencing the source address field, each specifying a different acceptable value. A feature can specify a range of acceptable values, which is used when handling address prefixes or port ranges.
  A feature match action is created to group together all the requirements for each single rule in the NSG. The field match action identifies the set of features that must match for a rule to match. For example, a rule that matches a source address and source port is identified by a feature match action identifying the feature for the source address and the feature for the source port. The feature match action identifies the packet processing flow to apply to a matching packet; either a no-op for an allow rule (continuing the packet's flow through the packet processing graph) or a drop action for a deny rule. Feature match actions are implemented in the same order as rule priorities.

In an embodiment, the disclosed techniques provide OR matching against terms in an NSG rule. Typically, packet matching is implemented as AND matching: a rule is described by multiple features, which are grouped into a feature match action where all features must pass.

The described techniques can allow for maintaining efficient use of computing resources such as processor cycles, memory, network bandwidth, and power. The disclosed embodiments provide an efficient way to map complex NSG rules into a packet processing engine. Other solutions are likely to implement NSG matching in hardware, which is not cost-effective for cloud-based microservices; restrict the complexity of matches that are allowed, for example by only allowing a single IP prefix or a single port range in a given programmed rule; or greatly increase the number of matches by defining a separate match for every possible single address value, port value, and the like.

The described techniques avoid these limitations by providing a way to convert from a complex set of match rules into rules for rapid packet processing in software based on field offsets and ranges of valid values. A user, for example, can configure highly complex rules in a portal and be confident that the rules will be applied with the correct logical AND and OR processing. The disclosed embodiments enable the determination that certain rules may apply to both IPv4 and IPV6 packets, or UDP and TCP packets, and automatic creation and storage of separate fields and features to define the correct matches. The disclosed embodiments also enable the storage of all features that define correct matches for a rule such that a nested loop finds all possible combinations of features that a packet may match against in order to match a rule.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1A:
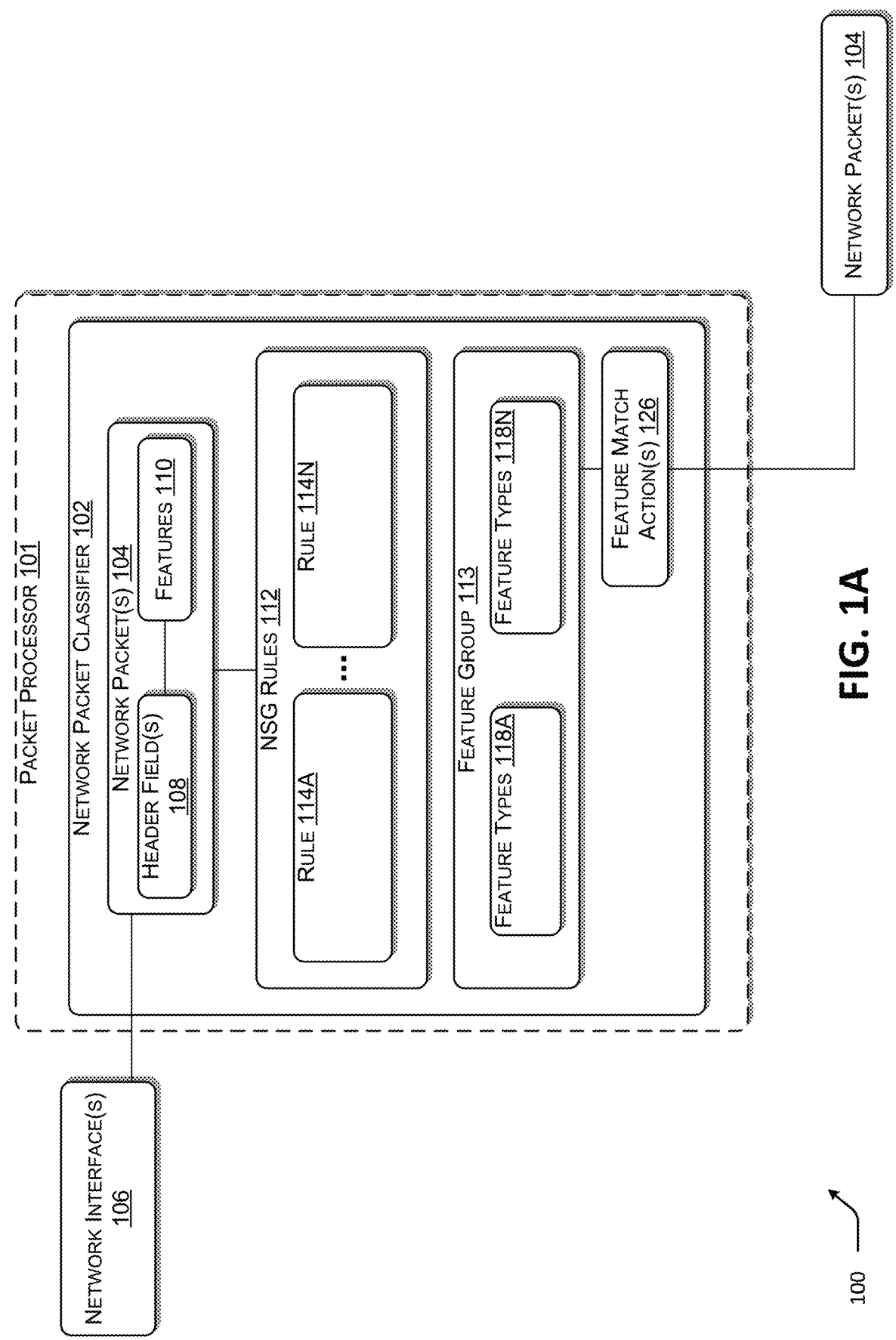
FIG. 1A is a diagram illustrating an example functional diagram in accordance with the present disclosure.

A network such as a software defined network (SDN) may include one or more devices that process inbound and outbound packet traffic, transform the packets such as by applying policies to the packets, and forward the packets. Such processes may include applying a packet processing graph which may comprise, for example, checking the content against a series of tables or other data structures, pattern matching against each table, and so forth.

An NSG contains a set of rules to apply in the inbound direction and a set of rules to apply in the outbound direction. NSG rules typically specify a five-tuple of packet properties:

Source address or prefix, or a comma-separated list of addresses or prefixes.

Destination address or prefix, or a comma-separated list of addresses or prefixes.

Source port, port range, or a comma-separated list of ports (10, 20, 30-60).

Destination port, port range, or a comma-separated list of ports.

IP protocol.

In order to match a rule, a packet must match all specified properties in a rule. Any combination of the above may be specified. A rule can be applied to both IPv4 and IPV6 packets, unless addresses or prefixes are specified and these are only IPv4 or are only IPV6. A rule can be applied to both UDP and TCP packets, unless an IP protocol is specified. Each rule is associated with a priority. Packets are matched against rules in priority order and processing stops when a packet has been successfully matched against a rule.

To apply NSG rules, feature classifiers can be used. A feature classifier works by defining a set of features and then defining match actions in terms of combinations of those features. A feature is a field extracted from the packet plus a range of acceptable values. The feature is matched if the field is within the range and not matched if the field is outside of the range.

In an embodiment, a field contains:
ID: unique identifier of the field
field_offset: offset in the packet to the value being checked.
field_mask: identifies the value to check.

In an embodiment, a feature contains:
ID: unique identifier of the feature
field: unique identifier of the corresponding field
min_value, max_value: minimum and maximum acceptable values that the field can take for the feature to match.

In an embodiment, a feature match action contains:
ID: unique identifier of the feature match action
features: list of features that, if all match, trigger a match
actions: list of actions to take if the criteria match
next_classifier: next classifier to move onto in the processing graph, or blank to stop processing.

In an embodiment, a feature classifier contains:

fields: all fields defined to match the feature classifier features: all features defined to match the feature classifier match_actions: all feature match actions defined to match the feature classifier, in priority order with the first entry as the highest priority.

Packet processing engines generally aim to achieve greater efficiency with fewer and more complicated classifiers. Packet processing engines typically packet match rules using netmasks to identify which part of a packet to search and specifying an acceptable value or range of values for a given field.

An NSG rule can contain multiple prefixes/addresses to match against. An NSG rule can contain comma-separated port ranges, which are not possible to describe using a simple range of values and where attempting to match against every possible individual value would be prohibitive in terms of performance. It is therefore desirable to configure the packet processing engine such that a packet matches a rule only when it matches against all specified properties, but where a packet can match against any specified value for each property.

The disclosed embodiments provide for a mechanism to provide OR matching against terms in an NSG rule. Typically, action matching uses AND matching: a rule is described by multiple features, which are grouped into a feature match action where all must pass.

In an embodiment, there are two cases where a rule can be implemented using OR matching:

(1) A single rule may match against IPv4 packets, IPv6 packets or both. If a source and/or destination address or prefix is specified, the rule matches against either IPv4 or IPv6 packets based on the address(es). However, a rule without addresses can match against both IPv4 and IPV6 packets. Such a rule is implemented in a way that a packet can match against an IPV4 port OR an IPV6 port, while still implementing any AND relationships (for example an IPv4 source port AND an IPV4 destination port).

(2) A single rule may contain a port range with multiple clauses: for example "40-50, 60-70"; or an address clause with multiple addresses. Such a rule is implemented such that a packet can match against one clause OR the other, while still implementing any AND required relationships. Where rules contain entries with multiple clauses, a large number of combinations of matches can exist.

In various embodiments, a packet processing engine parses individual rules and stores the information as follows:

An NSG is parsed to generate a map of parsed rules for each of the inbound and outbound directions.

Each rule contains a vector of source prefixes and a vector of destination prefixes, a vector of source port ranges and destination port ranges, and an optional protocol. A port range entry specifies a minimum and maximum port value to match against.

The rules in an NSG are parsed. A field is created to identify each part of a packet that corresponds to a property that is being checked.

Features are created for each rule to identify the values that must match for each clause in the rule. Features are grouped according to the type of packets that are matched (it should be noted that the names used herein are examples, and other names can be used):

A RuleFeatureIds structure contains identifiers of all features created to match a given rule. The structure splits the features required to match against IPv4 and IPV6 packets by grouping these features into two RuleIpTypeFeatureIds structures, one for IPV4 and one for IPV6 packets.

A RuleIpTypeFeatureIds structure contains the IDs of all features for a given rule that match against either IPv4 or IPV6 traffic. The structure contains: the feature ID matching on IP Type; vectors of feature IDs matching on source prefix and on destination prefix; an optional feature ID matching on packet protocol; and optional RuleProtocolTypeFeatureIds structures handling features required for TCP and UDP protocol packets. Each contain vectors of feature IDs for source and destination port matching.

For a rule that can apply to both IPv4 and IPV6 packets, and both TCP and UDP protocols (for example a rule that matches on source port range 10-20), the owning RuleFeatureIds contain two RuleIpTypeFeatureIds, one for IPV4 and one for IPV6 packets. Each contains two RuleProtocolType-FeatureIds, one for UDP and one for TCP packets. Each feature identifies the field that specifies where in the packet to look for the source port for that particular combination of IP and protocol type, and specifies the acceptable value or range of values for that field.

Features are combined into feature match actions, which specify the set of features that must match for a packet to match a rule. In an embodiment, the set of features can be determined by looping through the RuleFeatureIds and populating a vector of feature IDs. A populated vector contains a set of feature IDs that must match for a packet to match a rule.

In an embodiment, code can be implemented to execute a nested loop over the different types of features. Starting for IPV4 traffic with the IP type Feature ID, the code can loop through feature IDs of all source prefix matches. For each source prefix feature ID, the code can loop through feature IDs of all destination prefix matches, and continue until all types of features have been checked. If there are no feature IDs for a given type, the code can move onto the next type. UDP and TCP port feature IDs can be processed in parallel, as well as for IPv4 and IPv6 packets.

When complete, a single feature classifier is programmed for the NSG, and every possible combination of matches required by the NSG's rules is programmed as separate feature match actions within this feature classifier. This ensures high performance by meeting the objective that the number of classifiers is minimized within the packet processing framework.

FIG. 1A illustrates a system 100 for utilizing a network packet classifier 102 to classify and process a network packet 104, according to the disclosed embodiments. The network packet 104 can be provided to the network packet classifier 102 via a network interface 106 such as a network interface controller (NIC). The network packet 104 can include a set of header fields 108, each header field 108 containing data encoding an associated value. In various examples, a subset of the header fields 108 can form a header that encodes control information defining characteristics of the network packet such as source address (e.g., an internet protocol [IP] address) and protocol (e.g., user data gram protocol [UDP]). The network packet 104 can contain user data also known as a payload. Moreover, the system 100 can be a component within a greater network of computer networking devices. Collectively, a series of network packet classifiers can be referred to as a graph in which individual network packet classifiers devices can be nodes. The topology of the graph can be referred to as a graph configuration and inform various aspects of computer networking devices within a network.

After receiving the network packet 104, the network packet classifier 102 can apply one or several NSG rules 112 comprising a plurality of individual NSG rules 114A-114N.

To process the network packet 104, the network packet classifier 102 can extract header fields 108 that match the target data fields. For example, the target data fields of the rule 114A can target a source address and a protocol data field. Similarly, the target data fields of the rule 114N can target a source address and a destination address. The feature-based network packet classifier 102 can accordingly identify features 110 that are matched by the source address, destination address, protocol, and other header fields 108 of the network packet 104.

The identified features 110 can then be compared to feature types 118A-118N to determine if the network packet 104 matches any of the feature types 114A-114N. If the identified features 110 match one of the feature types 114A-114N, the network packet 104 can be considered a match for a rule 114. In various examples, matching a network packet 104 to a rule 114 can be considered a feature match action 126. The network packet 104 can be subsequently output by the network packet classifier 102 after the feature match action 126 is executed.

In an embodiment, a method is disclosed for generating the network packet classifier 102 for network security groups. The network packet classifier 102 is processed by a graph-based packet processor 101 in a communications network. The network packet classifier 102 is provided by the feature classifier as described above, and is configured to classify network packets 104 based on features grouped into feature types 118 corresponding to header fields 108 of the network packets. A single feature classifier 102 is generated to model all NSG rules 112 in a network security group for a single data traffic direction. The network security group is associated with a user network in the communications network. The single feature classifier 102 is generated by grouping header fields 108, features 113, and feature match actions 126 for network packets 106 in the communications network. The single feature classifier 102 is used to process network packets in the communications network. For example, a feature match action can be a denial of access to a network resource of the communications network.

In an example embodiment for implementing the disclosed techniques, at a basic level, a single feature classifier is defined to match all rules for a single NSG in a given direction.

The following describes an example of how NSG rules are processed:

```
for (rule in nsg.rules) {
    for (property in rule) {
        field_id = find_or_create_field(property)
        feature_id = create_feature(field_id, acceptable_values)
        add_feature_to_rule_features(feature_id)
    }
    create_feature_match_action(rule_features)
}
```

This code can be extended to handle the following:
A given rule may need to apply to both IPv4 and IPV6 packets, and/or both UDP and TCP packets.
It may not be possible to describe a given property as a simple range of acceptable values.

Figure 1B:
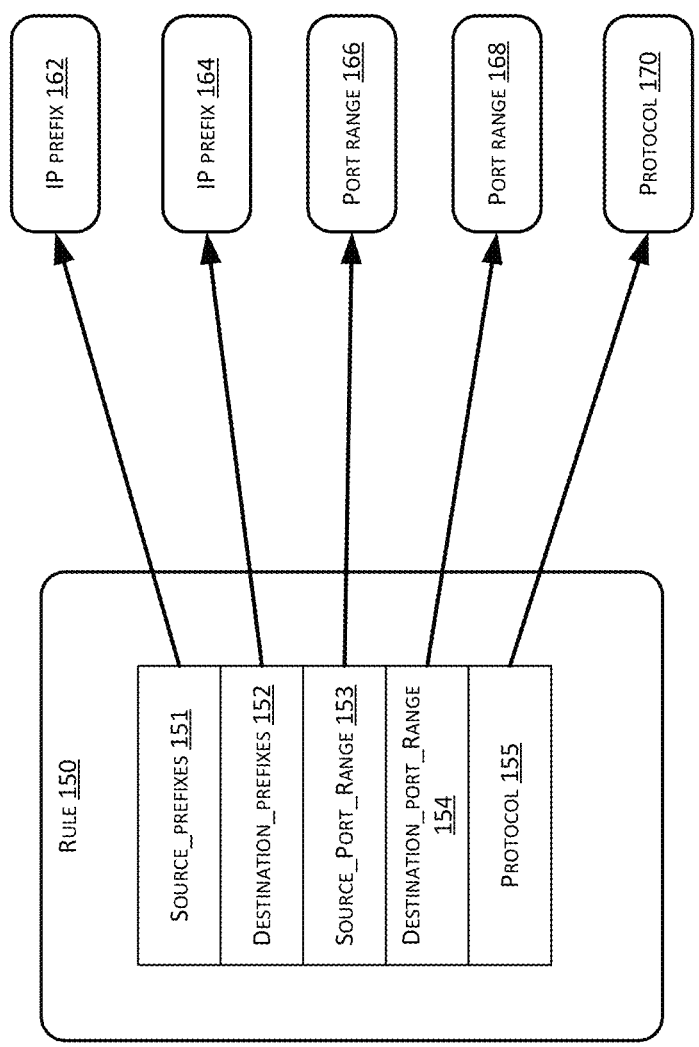
FIG. 1B is a diagram illustrating an example functional diagram in accordance with the present disclosure.

An NSG rule is parsed to separate all possible ranges of property values. In an example, a parsed rule can have the structure illustrated in FIG. 1B. After generating a parsed rule 150, NSG handling code determines whether a rule applies to IPv4 traffic, IPv6 traffic, or both. The code parses through any source prefixes 151 and destination prefixes 152 and determines IP prefixes 162, 164. If none are present, or both IPv4 and IPV6 prefixes are specified, it is determined that the packet applies to both IPv4 and IPV6 traffic. Otherwise, it is determined that the packet only applies to the type of traffic specified by the prefix type.

NSG handling code similarly determines whether a rule applies to UDP packets, TCP packets, or both. If a protocol 155 is specified, then the specified protocol 170 determines the type of packets. Else, if a source port range 153 and/or destination port range 154 is specified, the rule applies the port range to both UDP and TCP packets and reflected in port ranges 166, 168.

Figure 2:
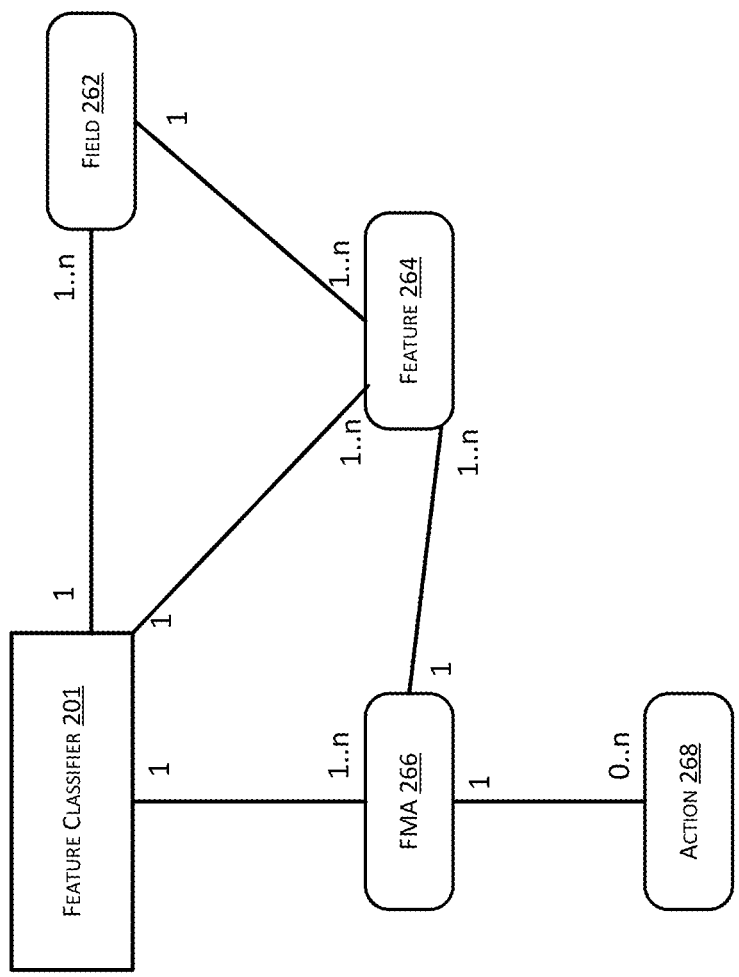
FIG. 2 is a diagram illustrating an example functional diagram in accordance with the present disclosure.

FIG. 2 illustrates an example of creating graph elements of a packet processing engine. NSG handling code creates the graph elements for the rules for a single NSG, which include:

A single feature classifier 201;
One field 262 corresponding to each property that is present in any rule. If multiple rules check the same property, only one field is needed. If a rule applies to both IPv4 and IPV6 packets, separate fields are created to handle IPV4 and IPV6 packets.
One feature 264 specifying a set of valid values for each property as specified by any rule, to generate a feature match action 266 and corresponding action 268.

Figure 3:
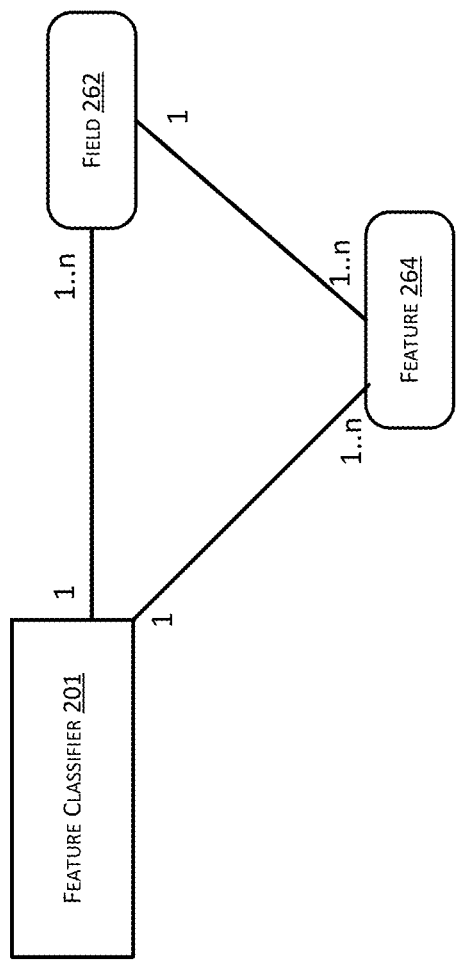
FIG. 3 is a diagram illustrating an example functional diagram in accordance with the present disclosure.
Figure 4:
FIG. 4 is a diagram illustrating an example functional diagram in accordance with the present disclosure.

FIG. 3 illustrates creation of the fields 262 and features 264 corresponding to the rules in an NSG by feature classifier 201. The features 264 corresponding to each single rule in an NSG are identified. FIG. 4 illustrates a RuleFeatureIds structure 420 that groups together the feature IDs created for a single rule for an NSG 410 that defines features 430.

Figure 5:
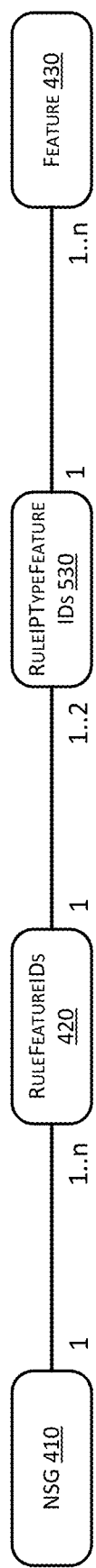
FIG. 5 is a diagram illustrating an example functional diagram in accordance with the present disclosure.
Figure 6:
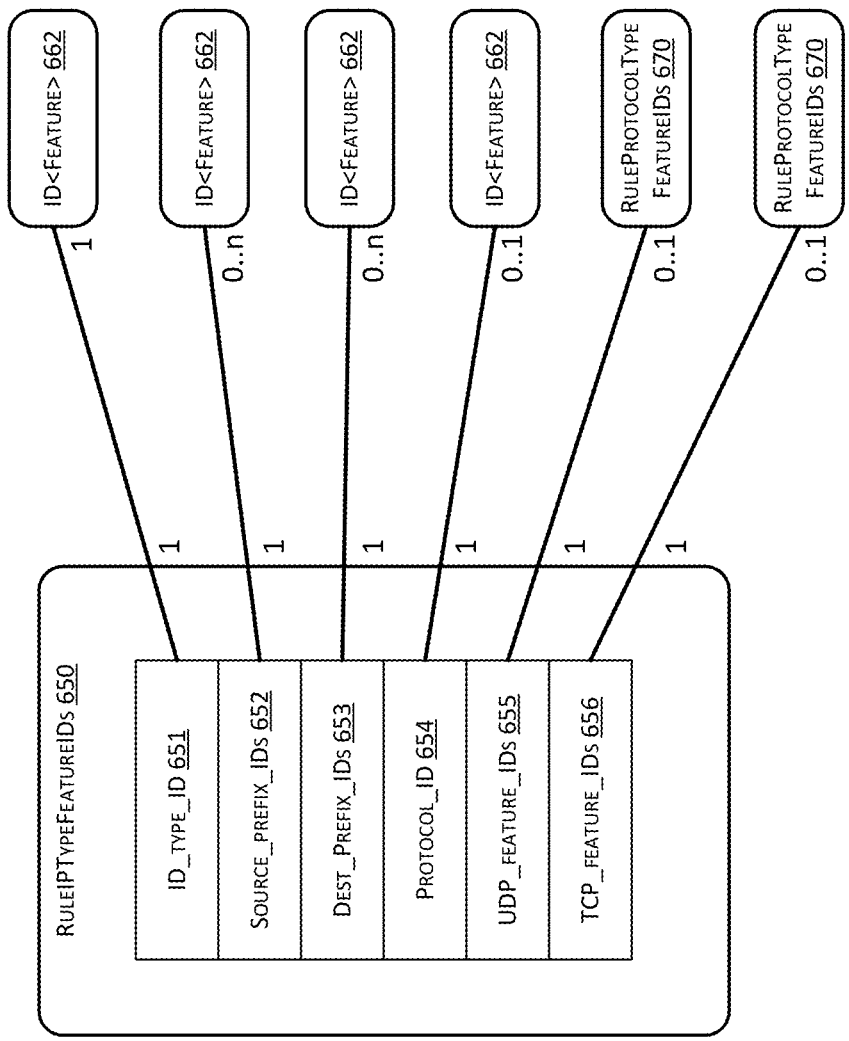
FIG. 6 is a diagram illustrating an example functional diagram in accordance with the present disclosure.

FIG. 5 illustrates a RuleIpTypeFeatureIds structure 530 that groups together the RuleFeatureIds structure 420 created for the single rule for an NSG 410 for a single IP type that defines features 430. FIG. 6 illustrates the feature IDs contained in RuleIpTypeFeatureIds 650. An NSG parser creates the feature IDs 662 and Rule Protocol Type feature IDs 670 by parsing each property in the parsed rule. Examples in FIG. 6 includes ID type 651, source prefix 652, destination prefix 653, protocol 654, UDP feature 655, and TCP feature 656. The NSG parser creates a feature for each match required by a property. If a property has multiple acceptable ranges of values, the NSG parser creates a separate feature for each acceptable value. A feature can match against a range of values, but a property that matches against a complex set of values requires multiple features.

When each feature is created, the NSG parser searches for an existing field to specify the part of the packet to check. If a field does not yet exist, the NSG parser creates a field.

Figure 7:
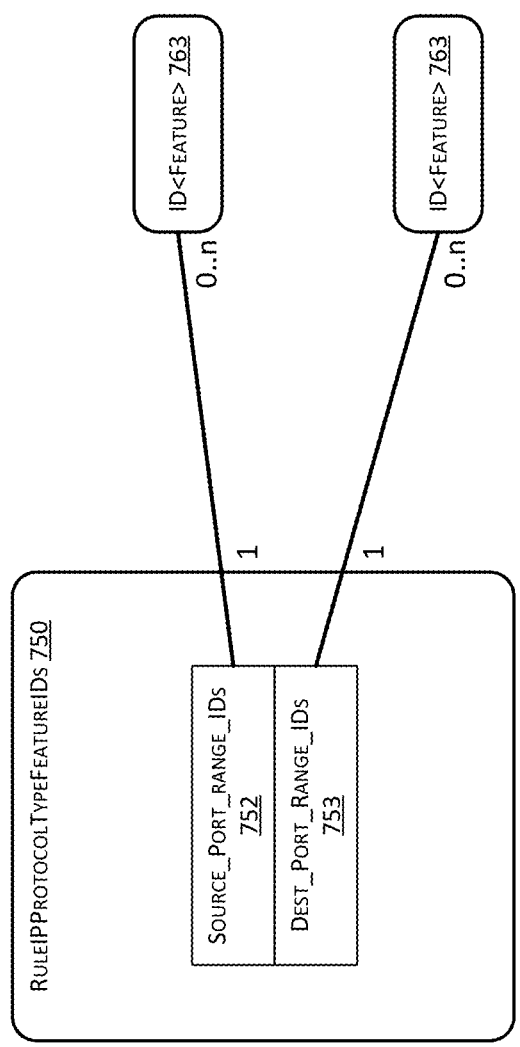
FIG. 7 is a diagram illustrating an example functional diagram in accordance with the present disclosure.

FIG. 7 illustrates a RuleProtocolTypeFeatureIds structure 750 that stores feature IDs 763 corresponding to source port 752 and/or destination port 753 matches for either UDP packets or TCP packets. The feature IDs 763 are present if the rule is allowed to match against the corresponding type of packet (if this is not restricted by a protocol match) and if a source port and/or a destination port match is specified.

Figure 8:
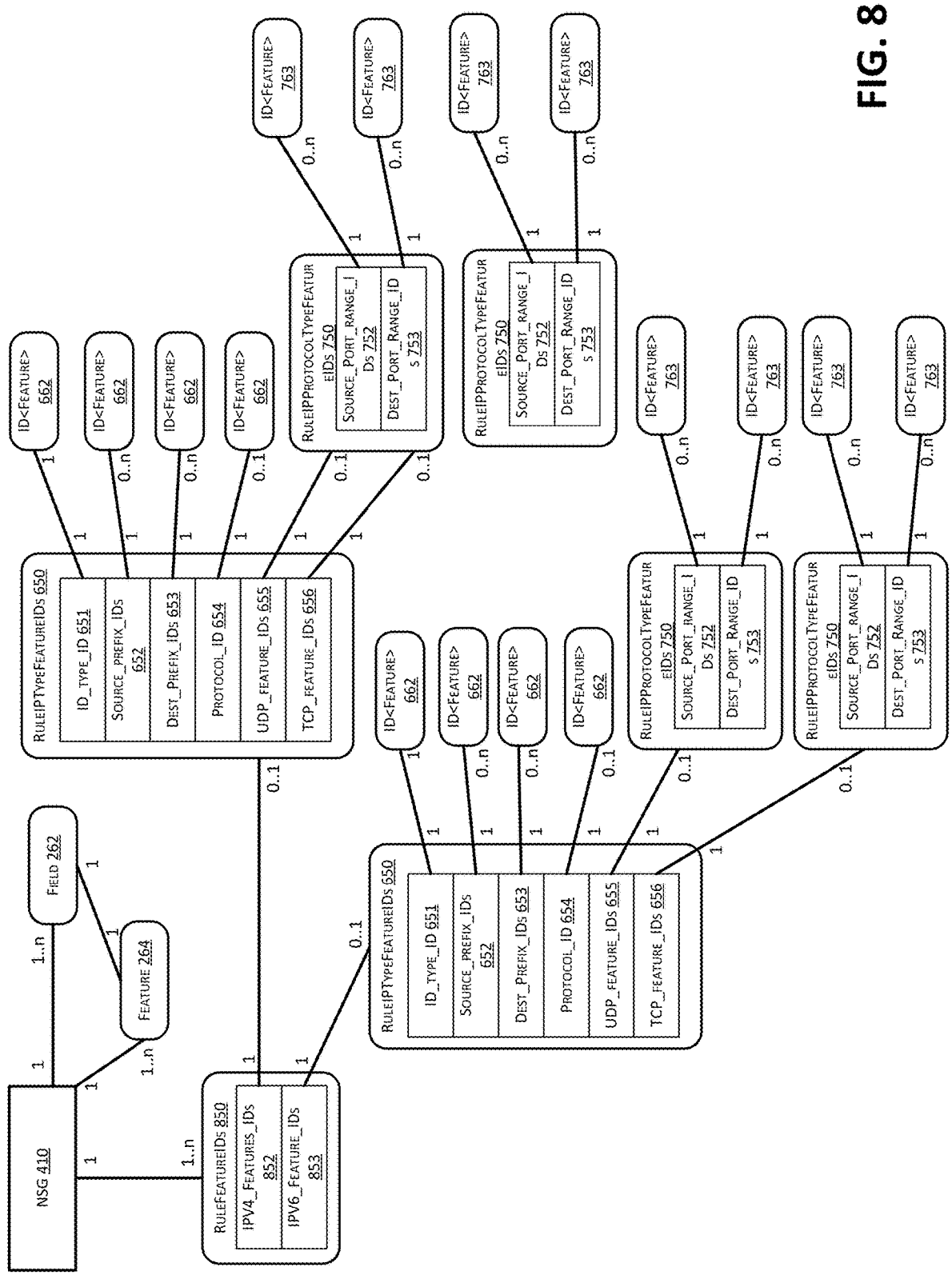
FIG. 8 is a diagram illustrating an example functional diagram in accordance with the present disclosure.

FIG. 8 illustrates an overall structure that shows the creation of features and fields for all rules in the single rule for an NSG 410 with reference to structures shown in FIGS. 1B through 7. Note that the fields and features created are not stored directly off the NSG structure but are referenced by feature IDs 662, 763. Each feature references its field by a field ID 662, 763.

The NSG parser creates feature match actions by grouping together sets of feature IDs for each rule. The separation of feature IDs into IPv4 features 852 and IPV6 features 853 in Rule Feature IDs 850, as well as into TCP and UDP Features, means that any possible combination of feature IDs in the corresponding owning structures is a possible match for that rule.

The NSG parser creates a feature match action for every possible combination of feature IDs in the structures for a given rule for IPV4 UDP packets; IPv4 TCP packets; IPv6 UDP packets; and IPV6 TCP packets.

The NSG parser populates a vector of feature IDs which contains the feature IDs for each required feature match action. In an embodiment, the NSG parser uses a nested loop to loop through all feature IDs for each property being matched against. Once the nested loop has completed for the current packet type (IPv4/IPv6, UDP/TCP), the parser continues with the next packet type until all packet types are complete for that rule. When all feature match actions have been completed for a rule, the parser moves onto the next rule and generates feature match actions in the same way. In an embodiment, pseudo code can include the following (not including separate processing for IPV4/IPv6 and TCP/UDP packets):

```
for (rule in nsg) {
    fma_feature_ids = vec[ ];
    fma_feature_ids.push(ip_type_id);
    for (id in source_prefix_ids) {
        fma_feature_ids.push(id);
        for (id in dest_prefix_ids) {
            fma_feature_ids.push(id)
            ...
            create_fma(fma_feature_ids)
            ...
            fma_feature_ids.pop( )
        }
        fma_feature_ids.pop( )
    }
}
```

The above pseudocode loop does not show the full level of nesting, where there is one nesting level for each property type that is possible to match against. In the case where there are no features defined for a given property for a given rule, the code steps through without attempting to add a feature ID to the vector, and unwraps without extracting the feature ID from the vector.

Figure 9:
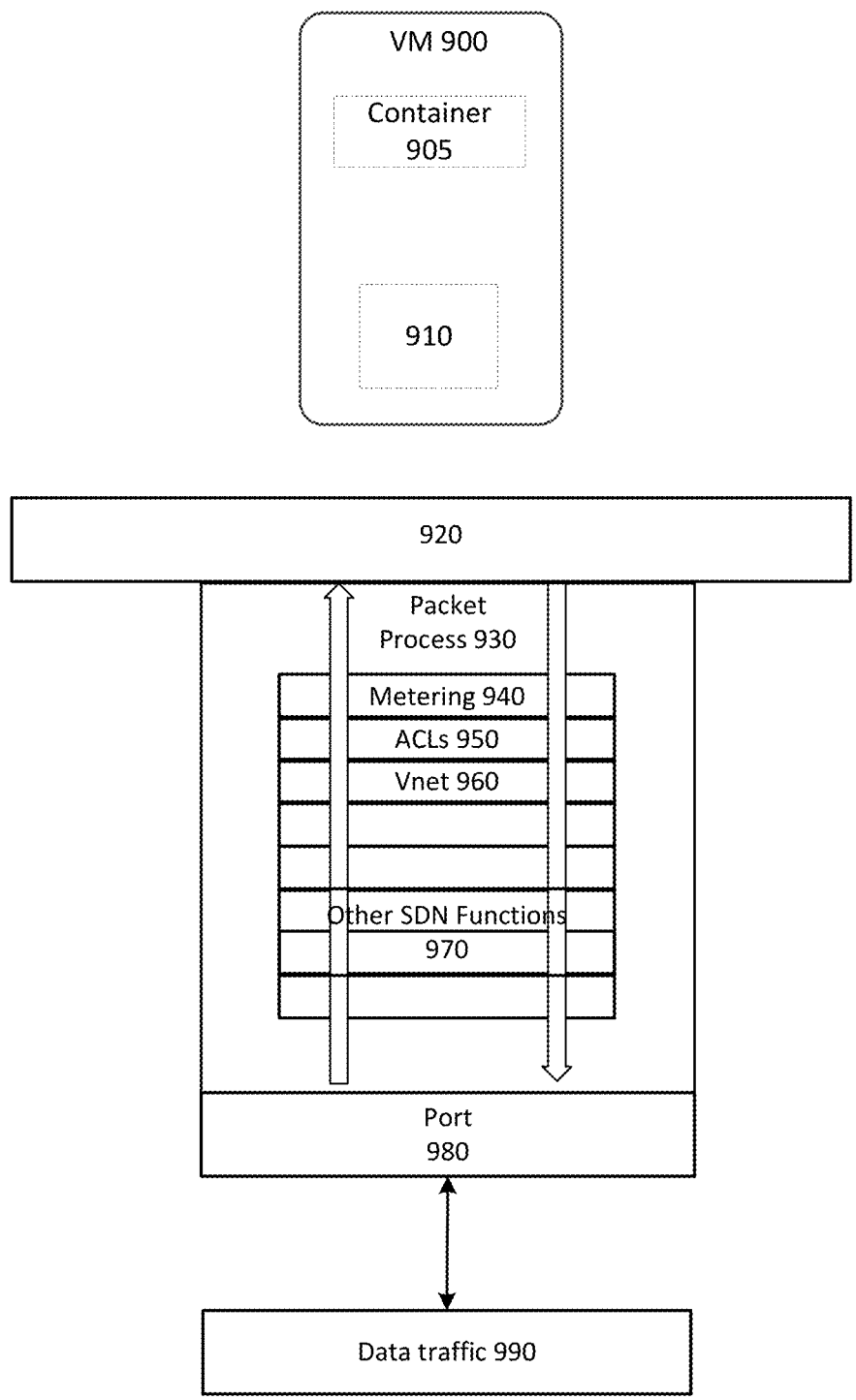
FIG. 9 is a diagram illustrating an example architecture in accordance with the present disclosure.

FIG. 9 shows an example packet processing engine 930 for a network device 920 that applies various operations on packets, such as specific networking policies that are tied to container 905. The network device 920 may logically underly the NIC 910 and may provide a port 980 for each VM supported by the NIC 910. The packet processing extension 930 may apply policies and transform or tunnel data packets in a given computing workload that are entering and leaving the VM 900. The packet processing extension 930 may include a central data packet processor (not shown) that performs the processing of data packets. The packet processing layers may include, in this example, those relating to metering 940, access control lists (ACLs) 950, VNet addressing/routing 960, and other various SDN functions or features 970 which may include, for example, those pertaining to routing, tunneling, filtering, address translation, encryption, decryption, encapsulation, de-encapsulation, quality of service (QoS), and the like. The packet processing function in the packet processing extension 930 may evaluate the packets of data traffic 990 as they traverse the networking policy layers, matching rules in each layer based on a state of the packet after an action is performed in the preceding layer. Returning packets may traverse the layers in the opposite direction and may be processed by the packet processing extension 930 to match the applicable rules. The rules used to express the networking policies may be entities that perform actions on matching packets (e.g., using a match action table model) as the computing workload is processed by the packet processing extension 930.

In some examples, packet processing rules may be expressed in tables where the device examines specific bits within the packet and compares the values of those bits with the keys stored in the various rows in the table. The table rows may also contain actions to perform on packets that match against them and may indicate a subsequent table of rules to check. Different packets in general may visit a different sequence of tables. The collection of tables and the links between them may be referred to as the packet processing graph or a generic flow table (GFT).

In some implementations, such as in a device with a hardware data plane, the graph may be fixed by the network processing units (NPUs) and packets may be processed through the graph by the NPUs without involvement by the device's central processing units (CPUs). This may provide one way to route packets quickly by using specialized hardware designed and optimized only for this purpose. However, in a device with a software data plane, packets may be processed through the graph by threads running on one or more of the device's CPUs which are dedicated to this purpose. These may be referred to as the packet processing pipeline threads.

In some implementations, the first packet in a flow may be identified and the first packet may be removed from the software or hardware-based pipeline to be handled by a separate control thread on another CPU. A flow may be a set of related packets, for example all TCP packets sent between a specific pair of IP addresses and ports, which tend to need the same actions to be performed on them. The control thread analyzes the packet, constructs the changes required to the graph, and applies those changes to the graph. This may consume significant processing overhead and introduce delays. The packet must typically wait in a queue before being processed by the control thread. The control thread must then analyze the packet's properties and which part of the graph intercepted it. The control thread then creates a new part of the graph and must then wait for a lock on the graph to impose the changes. The amount of processing required to perform these operations can be significant and the resulting delay may prevent subsequent packets in the flow from being processed before the required change to the graph is in place.

In some embodiments, the present disclosure may be implemented in a mobile edge computing (MEC) environment implemented in conjunction with a 4G, 5G, or other cellular network. MEC is a type of edge computing that uses cellular networks and 5G and enables a data center to extend cloud services to local deployments using a distributed architecture that provides federated options for local and remote data and control management. MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network.

Figure 10:
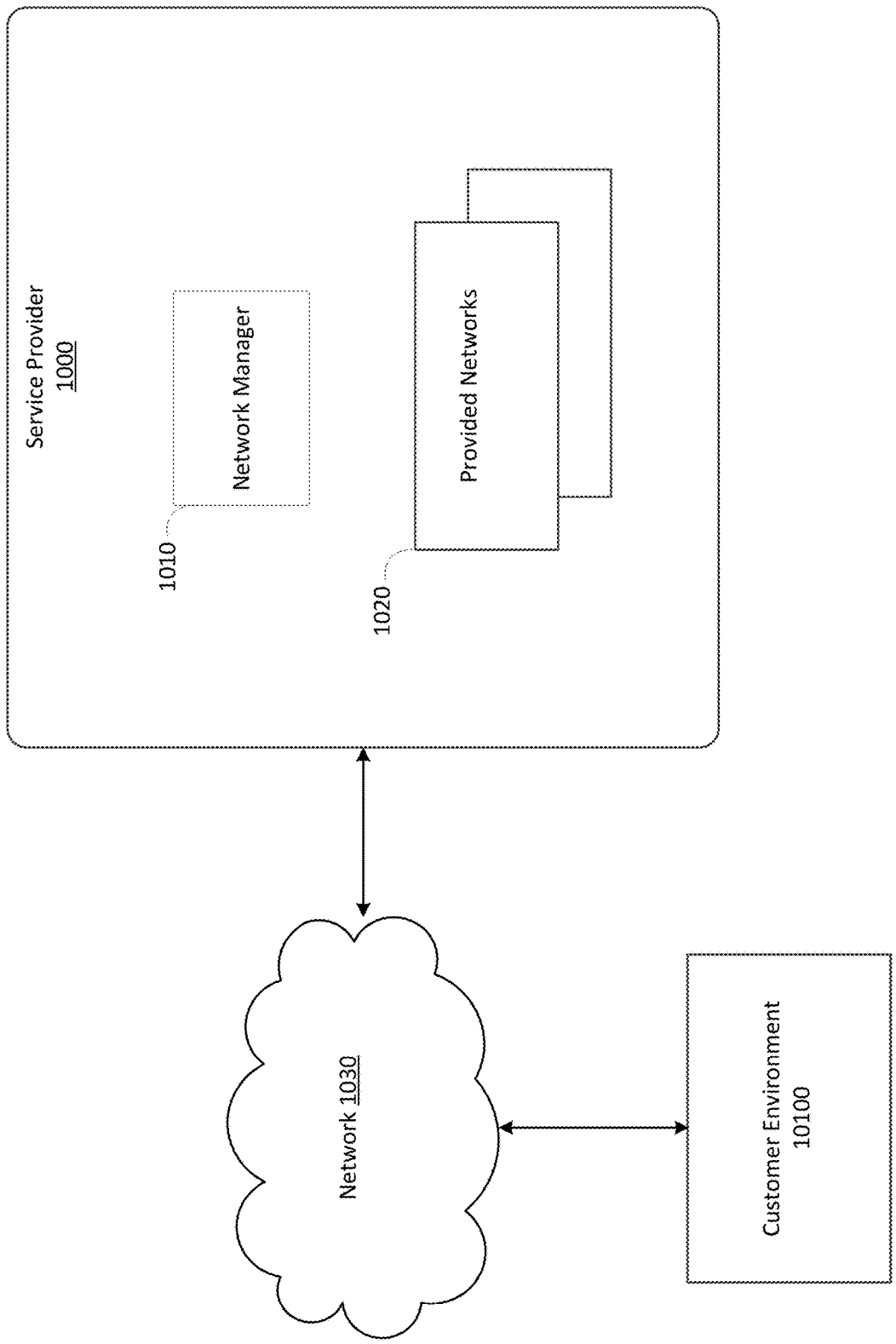
FIG. 10 is a diagram illustrating an example architecture in accordance with the present disclosure.

FIG. 10 illustrates an example computing environment in which the embodiments described herein may be implemented. FIG. 10 illustrates a service provider 1000 that is configured to provide computing resources including provided networks 1020 to users at customer environment 10100. The customer environment 10100 may have user computers that may access services provided by service provider 1000 via a network 1030. The computing resources provided by the service provider 1000 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like.

Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor). Networking resources may include virtual networking, software load balancer, and the like. The virtual machines may be configured to execute applications, including Web servers, application servers, media servers, database servers, and the like. Data storage resources may include file storage devices, block storage devices, and the like.

Service provider 1000 may have various computing resources including servers, routers, and other devices that may provide remotely accessible computing and network resources using, for example, virtual machines. Other resources that may be provided include data storage resources. Service provider 1000 may also execute functions that manage and control allocation of network resources, such as a network manager 1010.

Network 1030 may, for example, be a publicly accessible network of linked networks and may be operated by various entities, such as the Internet. In other embodiments, network 1030 may be a private network, such as a dedicated network that is wholly or partially inaccessible to the public. Network 1030 may provide access to computers and other devices at the customer environment 10100.

The disclosed embodiments may be implemented in a mobile edge computing (MEC) environment implemented in conjunction with a 4G, 5G, or other cellular network. The MEC environment may include at least some of the components and functionality described in FIG. 10 above. Additionally, components of a 5G network may include network functions such as a Session Management Function (SMF), Policy Control Function (PCF), and N7 interface. A radio access network (RAN) may comprise 5G-capable UEs, a base station gNodeB that communicates with an Access and Mobility Management Function (AMF) in a 5G Core (5GC) network. The 5G network may further comprise a User Plane Function (UPF) and Policy Charging Function (PCF).

It should be appreciated that although the embodiments disclosed above are discussed in the context of virtual machines, other types of implementations can be utilized with the concepts and technologies disclosed herein. It should be also appreciated that the network topology illustrated in FIG. 10 has been greatly simplified and that many more networks and networking devices may be utilized to interconnect the various computing systems disclosed herein. These network topologies and devices should be apparent to those skilled in the art.

Figure 11:
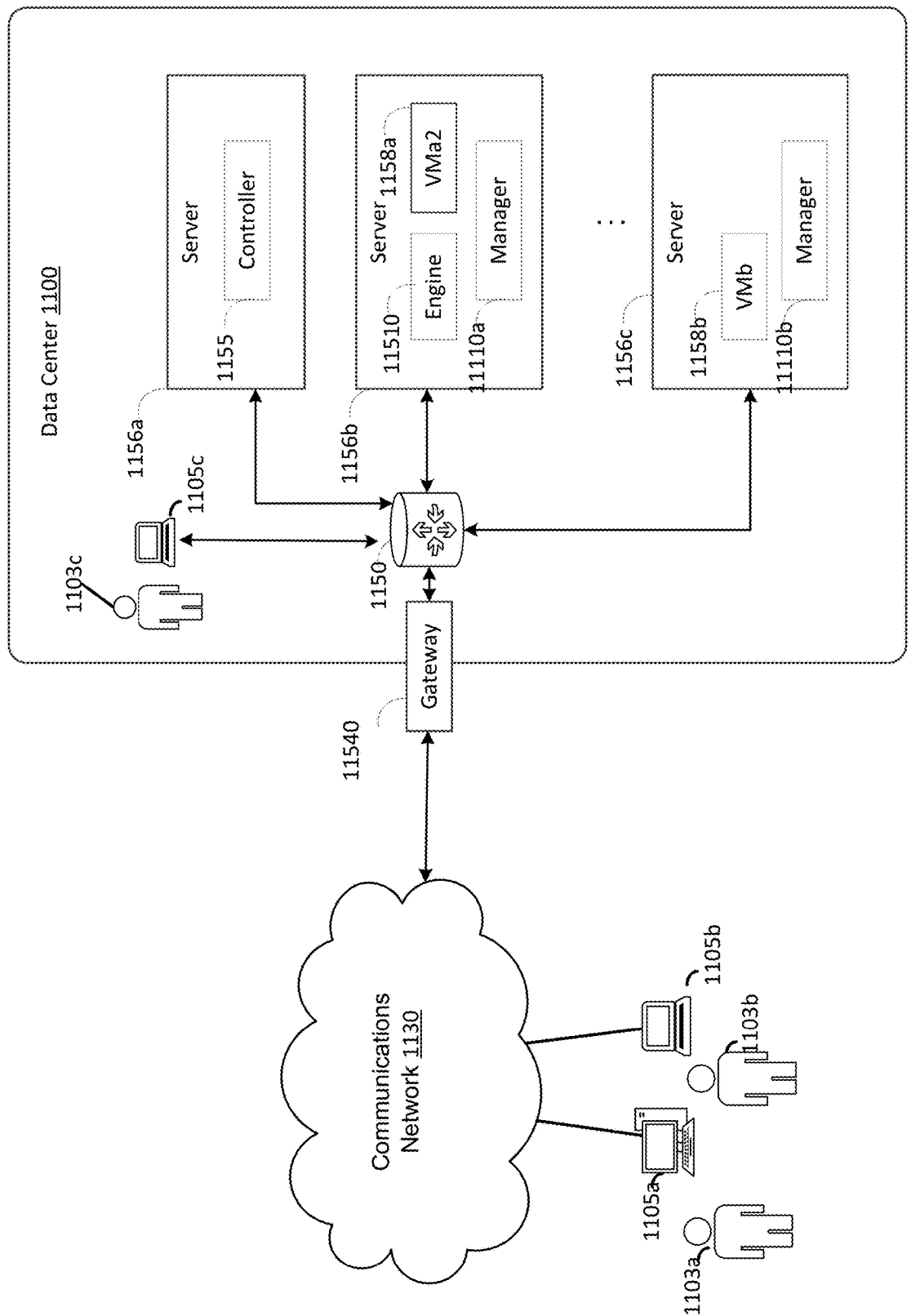
FIG. 11 is a diagram illustrating an example architecture in accordance with the present disclosure.

FIG. 11 illustrates an example computing environment in which the embodiments described herein may be implemented. FIG. 11 illustrates a data center 1100 that is configured to provide computing resources to users 1103a, 1103b, or 1103c (which may be referred herein singularly as "a user 1103" or in the plural as "the users 1103") via user computers 1105a, 1105b, and 1105c (which may be referred herein singularly as "a computer 1105" or in the plural as "the computers 1105") via a communications network 1130. The computing resources provided by the data center 1100 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 1100 may correspond to service provider 1000 of FIG. 10. Data center 1100 may include servers 1156a, 1156b, and 1156c (which may be referred to herein singularly as "a server 1156" or in the plural as "the servers 1156") that may be standalone or installed in server racks, and provide computing resources available as virtual machines 1158a and 1158b (which may be referred to herein singularly as "a virtual machine 1158" or in the plural as "the virtual machines 1158"). The virtual machines 1158 may be configured to execute applications such as Web servers, application servers, media servers, database servers, and the like. Other resources that may be provided include data storage resources (not shown on FIG. 11) and may include file storage devices, block storage devices, and the like. Servers 1156 may also execute functions that manage and control allocation of resources in the data center, such as a controller 1155. Controller 1155 may be a fabric controller or another type of program configured to manage the allocation of virtual machines on servers 1156.

In an embodiment, a rollout management engine 11510 as described herein may be implemented in server 1156b.

Referring to FIG. 11, communications network 1130 may, for example, be a publicly accessible network of linked networks and may be operated by various entities, such as the Internet. In other embodiments, communications network 1130 may be a private network, such as a corporate network that is wholly or partially inaccessible to the public.

Communications network 1130 provide access to computers 1105. Computers 1105 may be computers utilized by users 1103. Computer 1105a, 1105b or 1105c may be a server, a desktop or laptop personal computer, a tablet computer, a smartphone, a set-top box, or any other computing device capable of accessing data center 1100. User computer 1105a or 1105b may connect directly to the Internet (e.g., via a cable modem). User computer 1105c may be internal to the data center 1100 and may connect directly to the resources in the data center 1100 via internal networks. Although only three user computers 1105a, 1105b, and 1105c are depicted, it should be appreciated that there may be multiple user computers.

Computers 1105 may also be utilized to configure aspects of the computing resources provided by data center 1100. For example, data center 1100 may provide a Web interface through which aspects of its operation may be configured through the use of a Web browser application program executing on user computer 1105. Alternatively, a stand-alone application program executing on user computer 1105 may be used to access an application programming interface (API) exposed by data center 1100 for performing the configuration operations.

Servers 1156 may be configured to provide the computing resources described above. One or more of the servers 1156 may be configured to execute a manager 11110a or 11110b (which may be referred herein singularly as "a manager 11110" or in the plural as "the managers 11110") configured to execute the virtual machines. The managers 11110 may be a virtual machine monitor (VMM), fabric controller, or another type of program configured to enable the execution of virtual machines 1158 on servers 1156, for example.

It should be appreciated that although the embodiments disclosed above are discussed in the context of virtual machines, other types of implementations can be utilized with the concepts and technologies disclosed herein.

In the example data center 1100 shown in FIG. 11, a network device 1150 may be utilized to interconnect the servers 1156a and 1156b. Network device 1150 may comprise one or more switches, routers, or other network devices. Network device 1150 may also be connected to gateway 11540, which is connected to communications network 1130. Network device 1150 may facilitate communications within networks in data center 1100, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 11 has been greatly simplified and that many more networks and networking devices may be utilized to interconnect the various computing systems disclosed herein. These network topologies and devices should be apparent to those skilled in the art.

It should also be appreciated that data center 1100 described in FIG. 11 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 12A:
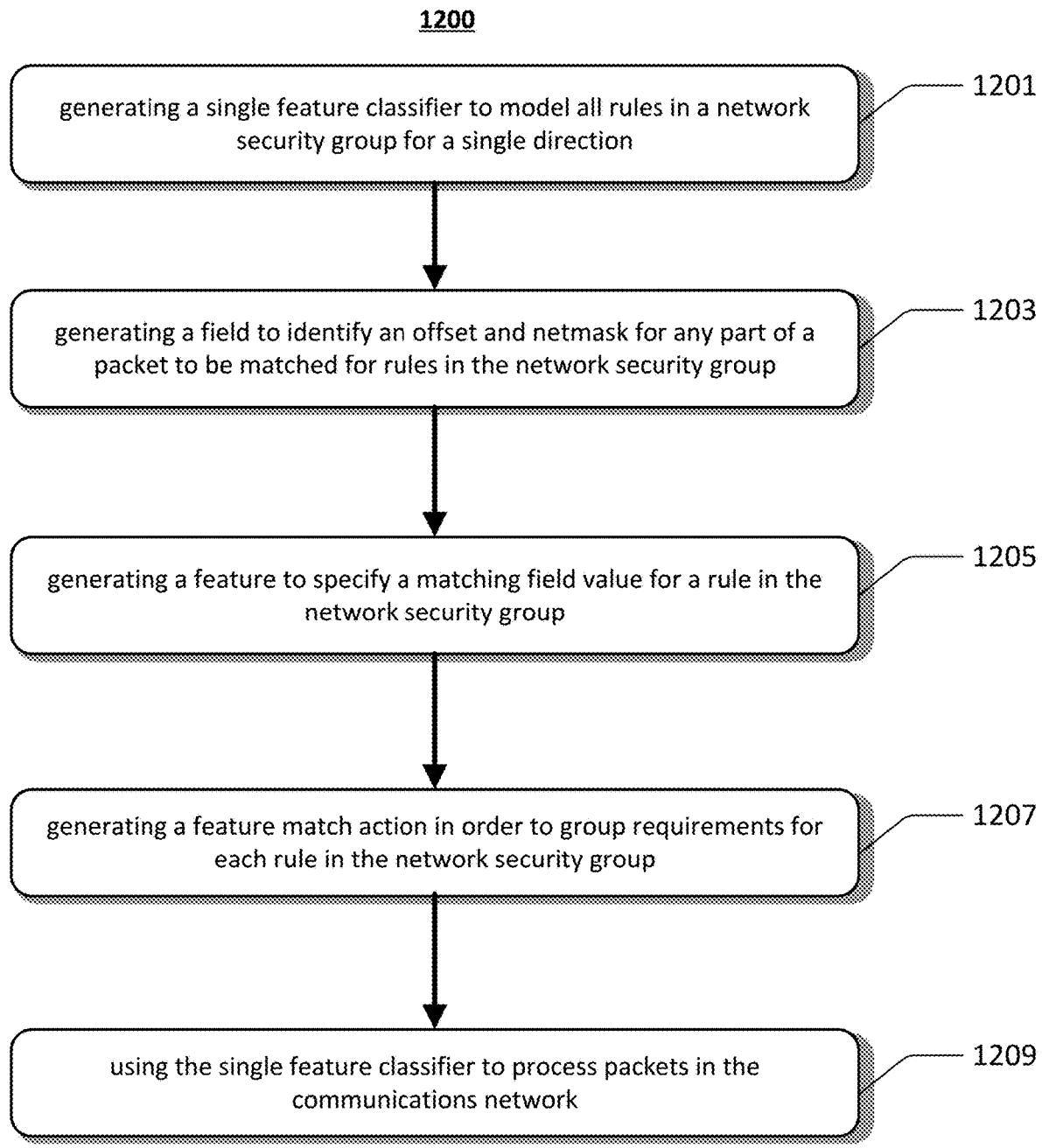
FIG. 12A is a flowchart depicting an example procedure in accordance with the present disclosure.

Turning now to FIG. 12A, illustrated is an example operational procedure 1200 for generating a classifier. Such an operational procedure can be provided by one or more components illustrated in FIGS. 1 through 11. The operational procedure may be implemented in a system comprising one or more computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

Referring to FIG. 12, operation 1201 illustrates generating a single feature classifier to model all rules in a network security group for a single direction.

Operation 1203 illustrates generating a field to identify an offset and netmask for any part of a packet to be matched for rules in the network security group.

Operation 1205 illustrates generating a feature to specify a matching field value for a rule in the network security group.

Operation 1207 illustrates generating a feature match action in order to group requirements for each rule in the network security group, wherein the feature match action identifies a set of features for a matching rule.

Operation 1209 illustrates using the single feature classifier to process packets in the communications network.

Figure 12B:
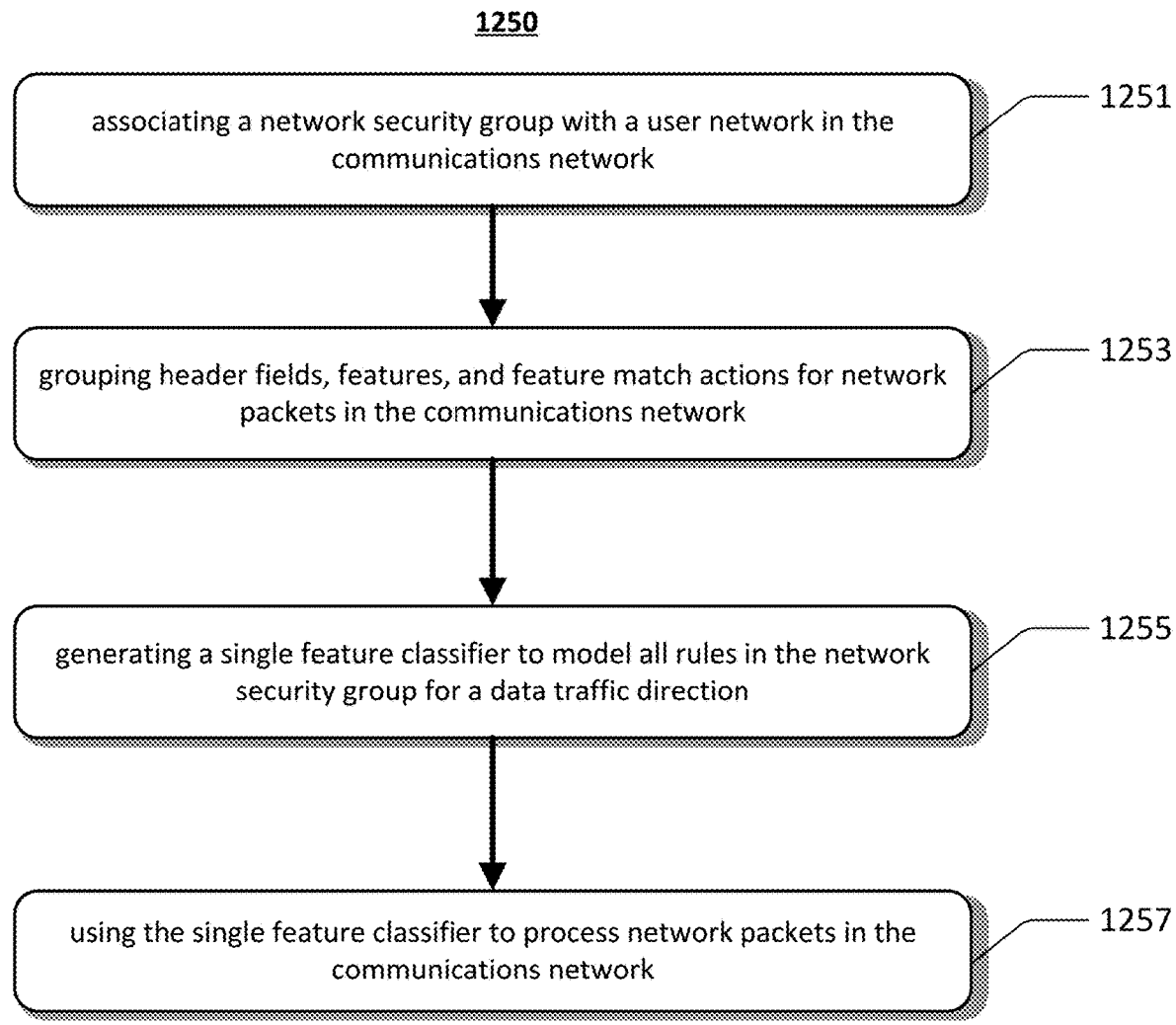
FIG. 12B is a flowchart depicting an example procedure in accordance with the present disclosure.

Turning now to FIG. 12B, illustrated is another example operational procedure 1200 for generating a classifier. Such an operational procedure can be provided by one or more components illustrated in FIGS. 1 through 11.

Referring to FIG. 12B, operation 1251 illustrates associating a network security group with a user network in the communications network.

Operation 1253 illustrates grouping header fields, features, and feature match actions for network packets in the communications network.

Operation 1255 illustrates based on the grouping of the header fields, features, and feature match actions for network packets in the communications network, generating a single feature classifier to model all rules in the network security group for a data traffic direction.

Operation 1257 illustrates using the single feature classifier to process network packets in the communications network.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine is described as running on a system, it can be appreciated that the routine and other operations described herein can be executed on an individual computing device or several devices.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc.

A component may also encompass other ways of leveraging a device to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. A component may represent a homogeneous collection of hardware acceleration devices, such as, for example, FPGA devices. On the other hand, a component may represent a heterogeneous collection of different types of hardware acceleration devices including different types of FPGA devices having different respective processing capabilities and architectures, a mixture of FPGA devices and other types hardware acceleration devices, etc.

Figure 13:
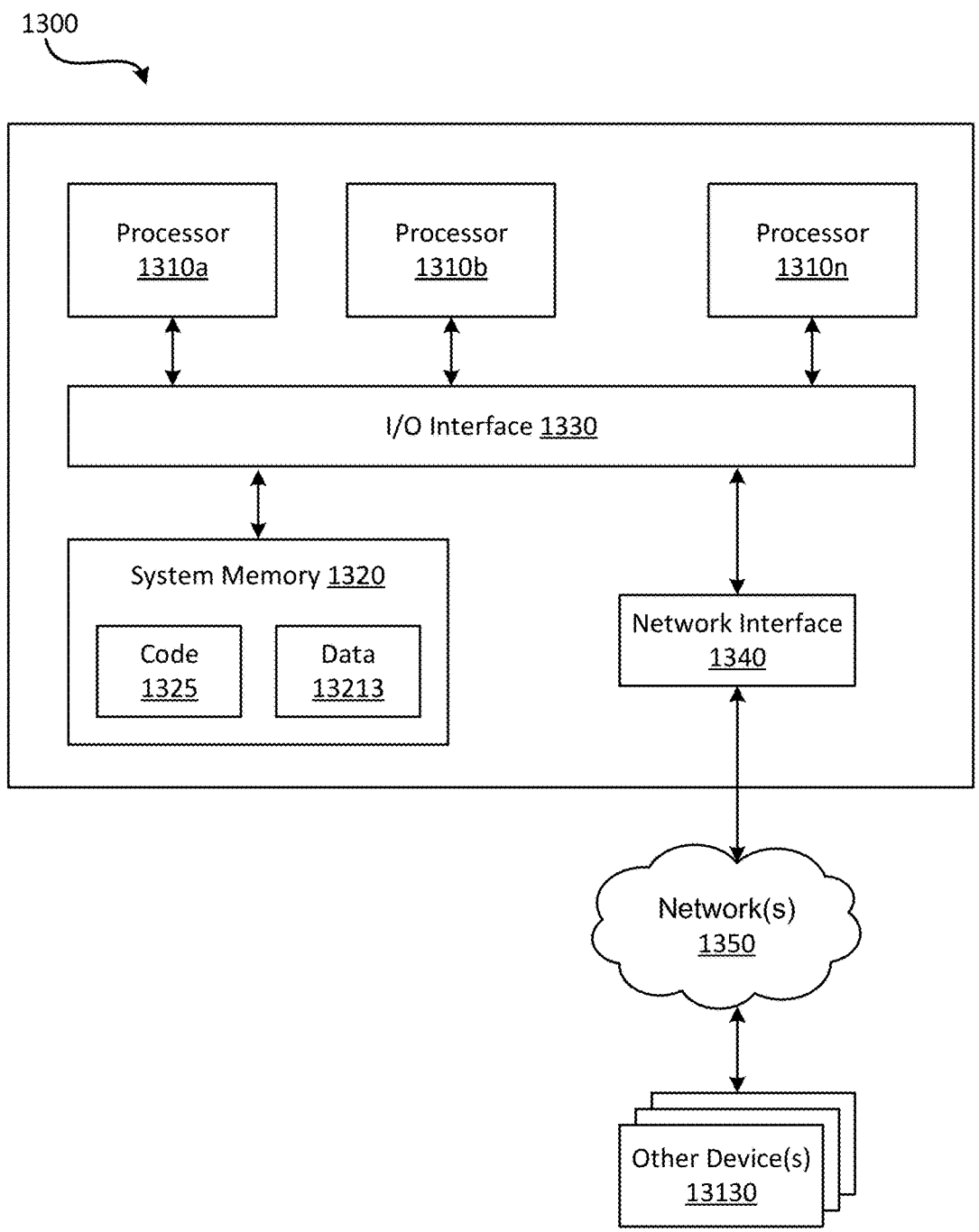
FIG. 13 is an example computing device in accordance with the present disclosure.

FIG. 13 illustrates a general-purpose computing device 1300. In the illustrated embodiment, computing device 1300 includes one or more processors 1310a, 1310b, and/or 1310n (which may be referred herein singularly as "a processor 1310" or in the plural as "the processors 1310") coupled to a system memory 1320 via an input/output (I/O) interface 1330. Computing device 1300 further includes a network interface 1340 coupled to I/O interface 1330.

In various embodiments, computing device 1300 may be a uniprocessor system including one processor 1310 or a multiprocessor system including several processors 1310 (e.g., two, four, eight, or another suitable number). Processors 1310 may be any suitable processors capable of executing instructions. For example, in various embodiments, processors 1310 may be general-purpose or embedded processors implementing any of a variety of instruction set architectures (ISAs), such as the x1313, PowerPC, SPARC, or MIPS ISAs, or any other suitable ISA. In multiprocessor systems, each of processors 1310 may commonly, but not necessarily, implement the same ISA.

System memory 1320 may be configured to store instructions and data accessible by processor(s) 1310. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 1320 as code 1325 and data 13213.

In one embodiment, I/O interface 1330 may be configured to coordinate I/O traffic between the processor 1310, system memory 1320, and any peripheral devices in the device, including network interface 1340 or other peripheral interfaces. In some embodiments, I/O interface 1330 may perform any necessary protocol, timing, or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components. Also, in some embodiments some or all of the functionality of I/O interface 1330, such as an interface to system memory 1320, may be incorporated directly into processor 1310.

Network interface 1340 may be configured to allow data to be exchanged between computing device 1300 and other device or devices 13130 attached to a network or network(s) 1350, such as other computer systems or devices as illustrated in FIGS. 9 through 12, for example. In various embodiments, network interface 1340 may support communication via any suitable wired or wireless general data networks, such as types of Ethernet networks, for example. Additionally, network interface 1340 may support communication via telecommunications/telephony networks such as analog voice networks or digital fiber communications networks, via storage area networks such as Fibre Channel SANs or via any other suitable type of network and/or protocol.

In some embodiments, system memory 1320 may be one embodiment of a computer-accessible medium configured to store program instructions and data as described above for FIGS. 1-8 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 1300 via I/O interface 1330. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 1300 as system memory 1320 or another type of memory. Further, a computer-accessible medium may include transmission media or signals such as electrical, electromagnetic or digital signals, conveyed via a communication medium such as a network and/or a wireless link, such as may be implemented via network interface 1340. Portions or all of multiple computing devices, such as those illustrated in FIG. 13, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 13, may include other components that are not explicitly shown in FIG. 13, or may utilize an architecture completely different than that shown in FIG. 13.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A machine-implemented method for generating a network packet classifier for network security groups, the network packet classifier to be processed by a graph-based packet processor in a communications network, the network packet classifier configured to classify network packets based on features grouped into feature types corresponding to header fields of the network packets, the method comprising:
  associating a network security group with a user network in the communications network;
  grouping header fields, features, and feature match actions for network packets in the communications network;
  based on the grouping of the header fields, features, and feature match actions for network packets in the communications network, generating a single feature classifier to model all rules in the network security group for a data traffic direction; and
  using the single feature classifier to process network packets in the communications network.

Clause 2: The method of clause 1, wherein a plurality of fields are associated with the single feature classifier by generating a field to identify an offset and netmask for any part of a network packet to be matched for rules in the network security group.

Clause 3: The method of any of clauses 1-2, wherein a plurality of features are associated with the single feature classifier by generating a feature to specify a matching field value for a rule in the network security group.

Clause 4: The method of any of clauses 1-3, wherein a plurality of feature match actions are associated with the single feature classifier by generating a feature match action in order to group requirements for each rule in the network security group, wherein the feature match action identifies a set of features for a matching rule.

Clause 5: The method of any of clauses 1-4, wherein the rules in the network security group are OR matched.

Clause 6: The method of any of clauses 1-5, wherein all combinations of matches required by rules for the network security group are programmed as a separate feature match action within the single feature classifier.

Clause 7: The method of clauses 1-6, wherein the feature match action is a denial of access to a network resource of the communications network.

Clause 8: A system for generating a network packet classifier for network security groups, the network packet classifier to be processed by a graph-based packet processor in a communications network, the network packet classifier configured to classify network packets based on features grouped into feature types corresponding to header fields of the network packets, the system comprising:
  a processing unit; and
  a computer readable medium having encoded thereon computer readable instructions that when executed by the processing unit cause the system to:
  generate a single feature classifier to model all rules in a network security group for a single data traffic direction, wherein the network security group is associated with a user network in the communications network, and wherein the single feature classifier is generated by grouping header fields, features, and feature match actions for network packets in the communications network; and
  use the single feature classifier to process network packets in the communications network.

Clause 9: The system of clause 8, wherein a plurality of fields are associated with the single feature classifier by generating a field to identify an offset and netmask for any part of a network packet to be matched for rules in the network security group.

Clause 10: The system of any of clauses 8 and 9, wherein a plurality of features are associated with the single feature classifier by generating a feature to specify a matching field value for a rule in the network security group.

Clause 11: The system of any of clauses 8-10, wherein a plurality of feature match actions are associated with the single feature classifier by generating a feature match action in order to group requirements for each rule in the network security group, wherein the feature match action identifies a set of features for a matching rule.

Clause 12: The system of any clauses 8-11, wherein the rules in the network security group are OR matched.

Clause 13: The system of any clauses 8-12, wherein all combinations of matches required by the network security group's rules are programmed as a separate feature match action within the single feature classifier.

Clause 14: The system of any clauses 8-13, wherein the feature match action is a denial of access to a network resource of the communications network.

Clause 15: A computer readable storage medium having encoded thereon computer readable instructions that when executed by a system cause the system to:
  generate a single feature classifier to model all rules in a network security group for a single data traffic direction, wherein the network security group is associated with a user network in a communications network, and wherein the single feature classifier is generated by grouping header fields, features, and feature match actions for network packets in the communications network, the single feature classifier being part of a network packet classifier to be executed by a graph-based packet processor in the communications network, the network packet classifier configured to classify network packets based on features grouped into feature types corresponding to header fields of the network packets; and use the single feature classifier to process network packets in the communications network.

Clause 16: The computer-readable storage medium of clause 15, wherein a plurality of fields are associated with the single feature classifier by generating a field to identify an offset and netmask for any part of a network packet to be matched for rules in the network security group.

Clause 17: The computer-readable storage medium of any of clauses 15 and 16, wherein a plurality of features are associated with the single feature classifier by generating a feature to specify a matching field value for a rule in the network security group.

Clause 18: The computer-readable storage medium of any of clauses 15-17, wherein a plurality of feature match actions are associated with the single feature classifier by generating a feature match action in order to group requirements for each rule in the network security group, wherein the feature match action identifies a set of features for a matching rule.

Clause 19: The computer-readable storage medium of any of clauses 15-18, wherein the rules in the network security group are OR matched.

Clause 20: The computer-readable storage medium of any of clauses 15-19, wherein all combinations of matches required by the network security group's rules are programmed as a separate feature match action within the single feature classifier.

The invention claimed is:

1. A machine-implemented method for generating a network packet classifier for network security groups, the network packet classifier to be processed by a graph-based packet processor in a communications network, the network packet classifier configured to classify network packets based on features grouped into feature types corresponding to header fields of the network packets, the method comprising:
    associating a network security group with a user network in the communications network;
    grouping header fields, features, and feature match actions for network packets in the communications network;
    based on the grouping of the header fields, features, and feature match actions for network packets in the communications network, generating a single feature classifier to model all rules in the network security group for a data traffic direction; and
    using the single feature classifier to process network packets in the communications network.

2. The method of claim 1, wherein a plurality of fields are associated with the single feature classifier by generating a field to identify an offset and netmask for any part of a network packet to be matched for rules in the network security group.

3. The method of claim 1, wherein a plurality of features are associated with the single feature classifier by generating a feature to specify a matching field value for a rule in the network security group.

4. The method of claim 1, wherein a plurality of feature match actions are associated with the single feature classifier by generating a feature match action in order to group requirements for each rule in the network security group, wherein the feature match action identifies a set of features for a matching rule.

5. The method of claim 1, wherein the rules in the network security group are OR matched.

6. The method of claim 1, wherein all combinations of matches required by rules for the network security group are programmed as a separate feature match action within the single feature classifier.

7. The method of claim 4, wherein the feature match action is a denial of access to a network resource of the communications network.

8. A system for generating a network packet classifier for network security groups, the network packet classifier to be processed by a graph-based packet processor in a communications network, the network packet classifier configured to classify network packets based on features grouped into feature types corresponding to header fields of the network packets, the system comprising:
    a processing unit; and
    a computer readable medium having encoded thereon computer readable instructions that when executed by the processing unit cause the system to:
    generate a single feature classifier to model all rules in a network security group for a single data traffic direction, wherein the network security group is associated with a user network in the communications network, and wherein the single feature classifier is generated by grouping header fields, features, and feature match actions for network packets in the communications network; and
    use the single feature classifier to process network packets in the communications network.

9. The system of claim 8, wherein a plurality of fields are associated with the single feature classifier by generating a field to identify an offset and netmask for any part of a network packet to be matched for rules in the network security group.

10. The system of claim 8, wherein a plurality of features are associated with the single feature classifier by generating a feature to specify a matching field value for a rule in the network security group.

11. The system of claim 8, wherein a plurality of feature match actions are associated with the single feature classifier by generating a feature match action in order to group requirements for each rule in the network security group, wherein the feature match action identifies a set of features for a matching rule.

12. The system of claim 8, wherein the rules in the network security group are OR matched.

13. The system of claim 8, wherein all combinations of matches required by the network security group's rules are programmed as a separate feature match action within the single feature classifier.

14. The system of claim 11, wherein the feature match action is a denial of access to a network resource of the communications network.

15. A computer readable storage medium having encoded thereon computer readable instructions that when executed by a system cause the system to:
    generate a single feature classifier to model all rules in a network security group for a single data traffic direction, wherein the network security group is associated with a user network in a communications network, and wherein the single feature classifier is generated by grouping header fields, features, and feature match actions for network packets in the communications network, the single feature classifier being part of a network packet classifier to be executed by a graph-based packet processor in the communications network, the network packet classifier configured to classify network packets based on features grouped into feature types corresponding to header fields of the network packets; and use the single feature classifier to process network packets in the communications network.

16. The computer readable storage medium of claim 15, wherein a plurality of fields are associated with the single feature classifier by generating a field to identify an offset and netmask for any part of a network packet to be matched for rules in the network security group.

17. The computer readable storage medium of claim 15, wherein a plurality of features are associated with the single feature classifier by generating a feature to specify a matching field value for a rule in the network security group.

18. The computer readable storage medium of claim 15, wherein a plurality of feature match actions are associated with the single feature classifier by generating a feature match action in order to group requirements for each rule in the network security group, wherein the feature match action identifies a set of features for a matching rule.

19. The computer readable storage medium of claim 15, wherein the rules in the network security group are OR matched.

20. The computer readable storage medium of claim 15, wherein all combinations of matches required by the network security group's rules are programmed as a separate feature match action within the single feature classifier.

* * * * *